(12) United States Patent
Ceratto

(10) Patent No.: US 7,870,849 B2
(45) Date of Patent: Jan. 18, 2011

(54) METHOD AND GROUP FOR THE LPG FEEDING OF AN INTERNAL COMBUSTION ENGINE

(75) Inventor: Danilo Ceratto, Alba (IT)

(73) Assignee: M.T.M.-S.r.l., Cherasco (IT)

( * ) Notice: Subject to any disclaimer, the term of this patent is extended or adjusted under 35 U.S.C. 154(b) by 0 days.

(21) Appl. No.: 11/789,212

(22) Filed: Apr. 23, 2007

(65) Prior Publication Data

US 2008/0029072 A1    Feb. 7, 2008

(30) Foreign Application Priority Data

Apr. 26, 2006   (IT)   ............... TO2006A0304

(51) Int. Cl.
    *F02B 43/00*    (2006.01)
(52) U.S. Cl. ..................................... 123/527
(58) Field of Classification Search ............... 123/525, 123/527, 438, 490; 251/129.05, 129.08; 701/103; 137/1; *F02B 43/00*
    See application file for complete search history.

(56) References Cited

U.S. PATENT DOCUMENTS

| | | | |
|---|---|---|---|
| 4,587,986 A * | 5/1986 | Ullman et al. ............... | 137/1 |
| 4,606,322 A * | 8/1986 | Reid et al. ............... | 123/575 |
| 5,010,868 A | 4/1991 | Clements | |
| 7,182,073 B1 * | 2/2007 | Kim ............... | 123/527 |
| 2001/0003977 A1 | 6/2001 | Hayashi et al. | |
| 2003/0230249 A1 | 12/2003 | Yamaoka et al. | |
| 2005/0284451 A1 * | 12/2005 | Uhde et al. ............... | 123/525 |

FOREIGN PATENT DOCUMENTS

| | | |
|---|---|---|
| GB | 2135729 A | 9/1984 |
| JP | 2003090237 A | 3/2003 |
| JP | 2003239785 A | 8/2003 |
| WO | WO 01/59537 A1 | 8/2001 |
| WO | WO 2005/038227 A2 | 4/2005 |

OTHER PUBLICATIONS

European Search Report for EP 07106884, completed Jan. 27, 2010.

* cited by examiner

*Primary Examiner*—Michael Cuff
*Assistant Examiner*—Keith Coleman
(74) *Attorney, Agent, or Firm*—FSP LLC

(57) ABSTRACT

Method and group for feeding LPG to an internal combustion engine according to which during some engine operation instants the temperature of the LPG fed to injectors is determined and, for each temperature value, a correspondent value of a maximum optimal pressure is determined so that LPG remains in gaseous phase; an incoming LPG real pressure to the injectors is adjusted so that it is substantially the same of maximum optimal determined pressure and the gas flow from injectors is controlled according to the adjusted effective pressure of engine inlet camera and of the LPG temperature.

12 Claims, 3 Drawing Sheets

METHOD AND GROUP FOR THE LPG FEEDING OF AN INTERNAL COMBUSTION ENGINE

CROSS REFERENCE TO RELATED APPLICATION

This application claims priority under Title 35, United States Code Sections 119 and/or 365 to Italian patent application no. TO2006A 000304, filed on Apr. 26, 2006, the entire specification of which is hereby incorporated by reference for all purposes.

FIELD

The present invention relates to a method for feeding LPG to an internal combustion engine.

BACKGROUND

The LPG feeding system for an internal combustion engine usually involves the use of feeding devices including a LPG tank (part in liquid and part in gaseous phase), a group of reducer/vaporizer heated through the engine cooling liquid and two separate gas feeding systems both connected to the tank in different points to take one the gaseous LPG and the other the liquid LPG. The known feeding devices also include a selecting group to activate the gas circuit during the gas feeding (or LPG) gaseous phase when the engine cooling liquid temperature is lower than a determined value threshold and to activate the gas circuit feeding LPG in liquid phase as soon as the temperature of the cooling liquid exceed the above threshold value. In other words, the selecting group manages the switch from the gaseous to liquid feeding as soon as the cooling liquid is able to supply the necessary thermic energy for the vaporization of the liquid LPG.

The known feeding systems as described before, even if used, are complex under the manufacturing point of view especially for the two gas distinct feeding systems and the selecting group.

SUMMARY

The aim of the present invention is to give a method for feeding LPG to an internal combustion engine able to solve easily and economically the above described problems and that allows at the same time the engine to work with maximum performances in any working conditions.

According to the present invention is furnished a method for the LPG feeding to an internal combustion engine as claimed in the attached claims.

Moreover the present invention refers to a group for the LPG feeding to an internal combustion engine.

According to the present invention, a group of the LPG feeding to an internal combustion engine has been realized as claimed in the attached claims.

BRIEF DESCRIPTION OF THE DRAWINGS

The invention will be described with reference to the attached drawings indicating a non limitative application example where.

DETAILED DESCRIPTION

Figure 1:
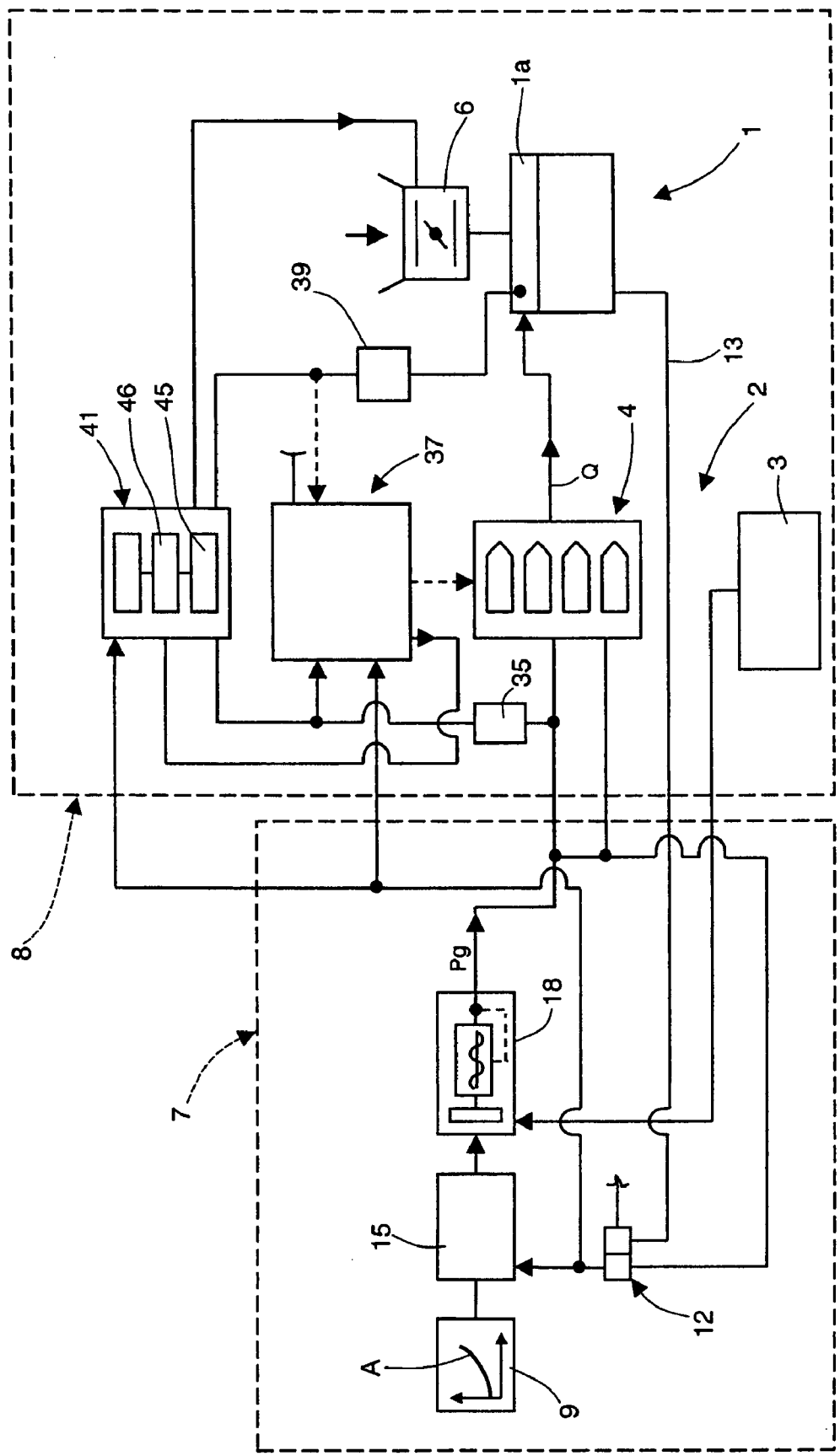
FIG. 1 is a block scheme for a preferred application of a group for the engine LPG feeding.

In FIG. 1 with reference 1 is indicated as a whole internal combustion engine of a vehicle (not shown) preferably a goods moving vehicle such as for example a forklift that will be referred to in this description without anyway losing the general aspect.

The engine 1 is changed to use gaseous LPG only and is fed by a feeding group 2 including a tank 3 from which the LPG is taken out in liquid phase, one or more injectors 4 of known type and schematically illustrated, suitable to supply an effective gas flow $Q_g$ in a chamber 1a of the engine 1. In the chamber 1a is also fed a controlled air flow supplied by a known type throttle regulating system or device indicated with number 6. Always with reference to FIG. 1, the group 2 further includes a LPG pressure control device 7 to injectors 4 and a LPG gas flow control device 8 supplied by injectors 4 themselves according to the pressure and temperature of LPG at the inlet of injectors 4 and the engine 1 operation conditions as better explained later.

Figure 3:
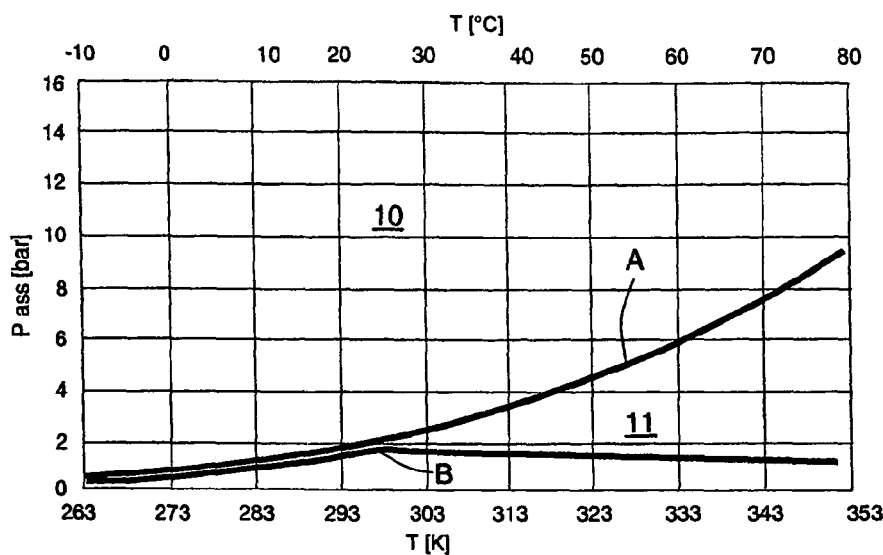
FIGS. 3-5 are graphics indicating some significant variables during the operation of the group described in FIG. 1.

The device 7 comprises a memory block 9 where a LPG pressure/temperature limit curve has been memorized and is indicated with A in FIG. 3. As shown in graphic of FIG. 3 the limit curve A divides an area 10 where LPG is in a liquid phase and an area 11 where LPG is in a gaseous phase.

The device 7 also includes a determination block 12 to determine the temperature of LPG sent to injectors 4. In the example disclosed, the block 12 is able to determine the above mentioned temperature both by taking it upstream injectors 4 and/or in the injectors themselves or to calculate it according to the temperature of the cooling liquid of motor 1 and/or the LPG flow rate. In this last case, the cooling liquid pipe 13 connects the engine 1 to block 12. An indicative change of the LPG temperature variation in the time starting with the vehicle ignition and with the engine rpm change represented by N curve is indicated by line T in FIG. 4. Block 9 and 12 are connected to a block 15 that is part of device 7 and is able to determine a gas pressure limit value for each temperature value received by block 12. In order to supply LPG in gaseous phase, the above limit value is reduced by block 15 itself by using a variable safety correction factor obtaining a maximum optimal pressure value for safety operation for each temperature value.

In the preferred example, the operation maximum optimal pressure values constitute part of line B in FIG. 3.

With reference to FIG. 1 the device 7 also comprise a block 18 for confrontation and adjustment suitable to check the pressure of LPG sent to injectors 4 so that at each moment it is substantially the same as the determined maximum optimal one.

Figure 2:
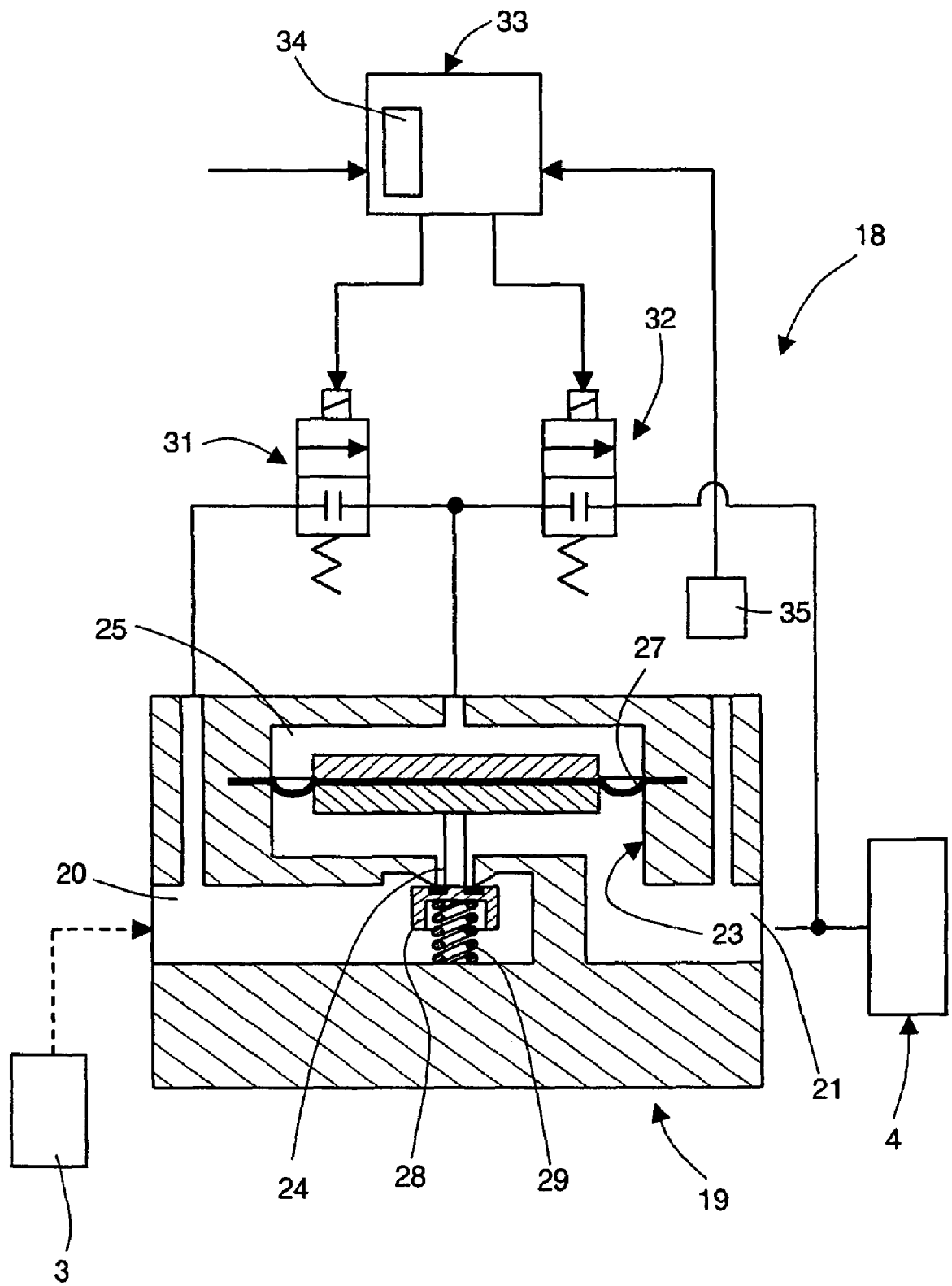
FIG. 2 shows a particular of group shown in FIG. 1 schematically and in section.

According to what indicated in FIG. 2, the block 18 comprises a pressure interception/reduction valve 19 with an inlet 20 connected to the LPG tank 3 or to a different pressurized room and on outlet 21 connected to injectors 4 and in turn comprising a chamber 23 connected to outlet 21 and with the inlet 20 through the passage 24. The valve 19 further comprises a waterproof chamber 25 separated from chamber 23 by a flexible diaphragm 27 and a shutter 28 which is carried by diaphragm 27 and moves under the action of diaphragm 27 and of a spring 29 between a closing position (illustrated in FIG. 2) where the chamber 23 is isolated from the inlet 20 by closing the passage 24 and an opening position, in which allows the LPG flow between the inlet 20 and the chamber 23.

Always with reference to FIG. 2, the block 18 comprises a mono-stable adjusting solenoidvalve 31 normally closed having an inlet connected to inlet 20 and an outlet communicating chamber 25. Chamber 25 is connected to the inlet of another mono-stable adjusting solenoidvalve 32 normally closed whose outlet is connected to outlet 21. Solenoidvalves 31 and 32 are controlled and selectively activated by a Control unit 33 connected to a pressure sensor 35 linked to outlet 21 to receive the effective pressure value of the LPG fed to injectors 4 and to block 15 to receive the maximum optimal pressure value.

The Control unit 33 includes a comparing block 34 that, after the comparison of the received two pressure values sends a difference value signal according to which the Control unit 33 activates one or the other of the solenoidvalves 31 or 32.

Figure 4:
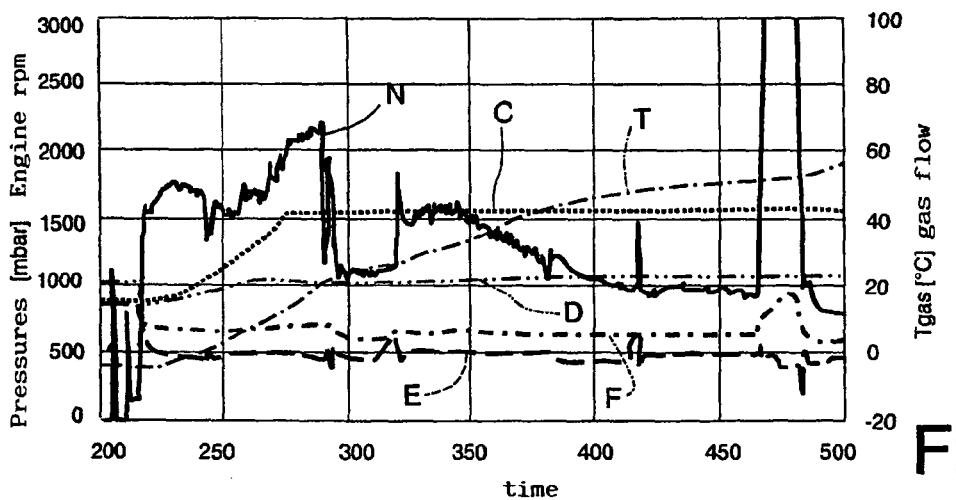

The trend in the time of the LPG effective pressure is represented by curve C in FIG. 4 by way of example only.

Always with reference to FIG. 1, injectors 4 are controlled by a proper control unit 37 to supply an optimal LPG flow to engine 1. In the preferred described example, the gas flow trend is indicated by curve F of FIG. 4.

The control unit 37 is part of the device 8 that also comprises the sensor 35 and a second pressure sensor 39 to supply to the control unit, 37 a signal corresponding to the effective pressure of the LPG fed to injectors 4 and, respectively, a signal corresponding to the pressure in chamber 1a, normally known as Pmap.

According to the two received signals and particularly on the basis of the connection between the two signal, the injectors manufacturing characteristics and the determined temperature, the control unit 37 controls the degree and the injectors 4 opening time so that the engine 1 is always fed with the required LPG flow. Moreover always with reference to FIG. 1, the device 8 further comprises a control unit 41 to limit the pressure inside the chamber 1a during some operating conditions. Particularly the control unit 41 comprises a memory block where a plurality of Pmap pressure maximum value in chamber 1a is memorized. All those values for the maximum pressure define the curve D in FIG. 4. The maximum pressure values are numerically determined according the LPG effective pressure values going in the injectors 4, to the injectors dimension characteristics, to the value of the LPG flow sent in the chamber 1 of the engine 1 determined by the control unit 37 and of the determined temperature of the LPG. Conveniently the control unit 41 determinates for each operation moment, the value of the maximum pressure value that is acceptable in the chamber 1a on the basis of the graphic in FIG. 5 indicating the value of the maximum pressure in chamber 1a according to gas flow and to the change of the pressure and temperature of the LPG itself going to injectors 4. The graphic in FIG. 5 indicates some curves only: each one is an isobaric curve corresponding to a determined value of the LPG pressure going to injectors 4 and a temperature determined value. Curves are disposed according to increasing pressure in the direction indicated by the arrow K in FIG. 5.

A mathematics relation linked among them the pressure in chamber 1, the real gas pressure and temperature, the characteristics of injectors and the gas flow is the following.

$$Qg = \frac{S \cdot Pg}{\sqrt{RT}} \cdot \sqrt{2 \cdot \frac{k}{k-1} \cdot \left[\left(\frac{Pmap}{Pg}\right)^{\frac{2}{k}} - \left(\frac{Pmap}{Pg}\right)^{\frac{k+1}{k}}\right]}$$

Where Pg indicates the effective gas pressure taken from the sensor 38, Pmap indicates the pressure in the chamber 1a taken by the sensor 39, Qg indicates the LPG flow sent to the engine, S indicates the equivalent section of the nozzles and R and T are the elasticity constant and, respectively, the gas temperature and k is the polytropic exponent of the gas expansion. When the variables are fixed, from the previous mathematics relation, the maximum pressure in chamber 1a making the injectors supply the required gas flow is calculated.

Moreover the Control unit 41 further comprises a comparing block 45 that compares the instant value of the pressure in chamber 1a with a correspondent calculated maximum value and, when the detected pressure value exceeds the calculated one, it sends a signal to a control block 45 operating on the throttle device 6 in order to limit the pressure inside the chamber 1a lower than the maximum calculated value and, consequently, the engine 1 power. During controlled operations, the values of the pressure inside chamber 1 a are indicated in the curve E of FIG. 4.

Figure 5:
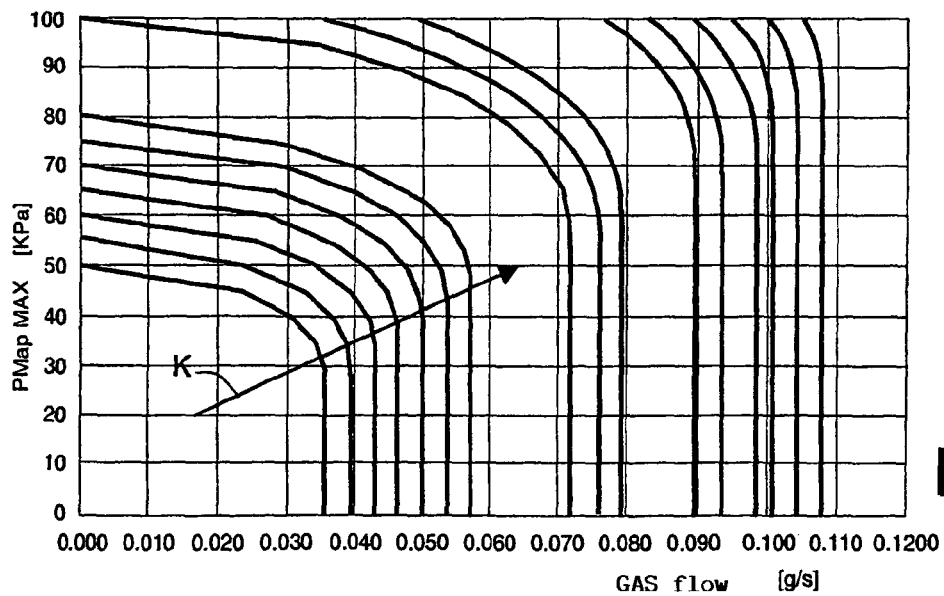

The operation of group 2 after the start up of the engine 1 will be described referring to FIG. 1 and to the graphics of FIG. 3-5. When starting the engine 1 and in a plurality of following instants till reaching a running condition, the block 12 determines the temperature of gas fed to injectors 4 while sensors 35 and 39 detect the pressure of the LPG in the inlet of the injectors 2 and in the chamber 1a of the engine. In each operation instant or at least for part of them, the block 12 sends a temperature value to block 15. Block 15, referring to the curve A memorized in block 9, determines the maximum optimal pressure value of the LPG so that the LPG remains in gaseous phase. This maximum optimal pressure value is obtained by taking a pressure limit value on curve A and reducing it through a variable safety correction factor obtaining a series of values for optimal pressure defining line B in FIG. 3. In each instant, the block 18 adjusts the gas effective pressure sent to injectors by leading it to a value close to the correspondent maximum optimal pressure one. The adjustment is carried out as follow: the sensor 35 collects the LPG effective pressure at the outlet 21 and informs the value to the control unit 33 that compares it with the determined maximum optimal pressure value. If the collected pressure is higher than the correspondent maximum optimal pressure value, the control unit 33 activates the solenoidvalve 32 that connects the chamber 25 to the outlet 21. By doing this the pressure inside the chamber 35 decreases till being equal to the one in chamber 21. As for the pressure difference on the diaphragm 27 and the spring 29, the shutter 8 is moved from the closing position 'causing a pressure decrease. On the other hand, when the pressure to the outlet 21 is lower than the correspondent maximum optimal pressure value, the control unit 33 activates the solenoidvalve 31 and that increases the pressure in the chamber 25 so that, thanks to the higher difference of pressure on the diaphragm 27, the shutter is mover from the opening position causing a pressure increase. By doing this, the LPG effective pressure in outlet 31 has always a value close to the determined maximum optimal one, without significant differences.

In each of the described operation instants, the sensors 35 and 39 collect the pressure values and inform the control unit 37 that, according to the temperature, adjusts the timing and the opening of the injectors to supply the required LPG quantity. The physical limit of the gas flow through injectors 4, when they work in sub-critical conditions, is managed by control unit 41 that, according to the pressure in the engine chamber 1a, to the LPG effective pressure, to the gas flow supplied to injectors and to the gas temperature, determines for some of the operation instants an acceptable maximum pressure value inside chamber 1a. When the pressure in the chamber 1a exceeds this value the control unit 41 acts on the device 6 to adjust the throttle body controlling the value of the pressure in chamber 1a in order to keep the pressure to this limit value or lower than it.

It is clear that the maximum pressure in chamber 1a has to keep into consideration the gas flow as this value can be kept more higher than less is the required gas flow. Anyway the limit value of the pressure in chamber 1a is determined, in case of not supercharged engines, by the atmospheric pressure. On the basis of what precedes, it is clear the instantaneous collection of the supplied gas temperature and the determination for each value of the temperature itself of a correspondent objective pressure value of the gas close to a limit value, allows to operate always in gaseous phase gas limit conditions that means with the best efficiency without using LPG in liquid phase.

Parallelly, the injectors control according to a feeding effective pressure as directly detected and to the supplied gas effective temperature, allows a precise control and adjustment of the gas flow sent to the engine both during normal operation and when the injectors works or are close to work in sub-critical conditions. During this last condition, the described group 2 is able to intervene on the engine control by limiting the pressure in the air-LPG inlet chamber and on the engine supplied power, according to the pressure before and after the injectors, of their geometric characteristics, the temperature and the effective gas flow going through the injectors. This is extremely important and has a particular value in the following transitory following the ignition of the engine as indicated by the variables in FIG. 4.

In this transitory, in fact, the gas pressure increases with the temperature till a maximum value chosen during the programming. This maximum value is according to the gas flow required by the engine and the injector characteristics.

As for all above, it is clear the both method and group 2 can be modified without with departing from the scope defined by the claims. Particularly, curves and ratio different from the indicated ones used by way of example only can be used to determinate the optimal maximum pressure, the gas flow and the pressure inside chamber 1a.

The invention claimed is:

1. Method for feeding LPG to an internal combustion engine, the method comprising the phases of sending, through injectors means a variable flow rate of LPG in gaseous state towards the engine and being characterized in that to determine in a plurality of moment of engine work, respective temperatures of the LPG fed to the injectors means to determine, for at least some of said LPG temperatures, a matching optimal maximum pressure value so that the LPG stays in gaseous stage, and to regulate the effective LPG pressure in entry to the fuel injectors means in such way that the effective pressure be substantially the same of the optimal maximum value determined, wherein detecting of said pressure optimal maximum value of LPG is effected memorizing a limit curve of the LPG that separates an area of gas in gaseous phase from an area of gas in liquid phase, and by obtaining on that curve, for at least part of the above determined temperatures, correspondent values of pressure.

2. Method according to claim 1, characterized by the fact the determination of each of the above temperatures is made by detecting directly one correspondent temperature of LPG in entry or inside the above injectors means.

3. Method according to claim 1, characterized by the fact that the determination of each the above temperatures of the LPG is made on the basis of the temperature of a cooling liquid of the above engine in the exact same instant.

4. Method according to claim 1, characterized by the fact of reducing the above value of pressure obtained through a determined reduction factor and variable according to the above temperature to obtain the above value of maximum optimal pressure.

5. Method according to claim 1, characterized by the fact the adjustment of said effective pressure is effected by detecting, in each said instant, the pressure of the gas sent to injectors, comparing the said detected pressure with the correspondent said value of maximum optimal pressure and activating selectively a first and a second solenoidvalve for the correction of the said effective pressure.

6. Method according to claim 1, characterized by the fact that, in said instants, the said LPG flow is controlled by varying the opening time of the injectors at least in function of the said gas effective pressure.

7. Method according to claim 6, characterized by the fact that, at least in some of those instants, the LPG gas flow is controlled even in function of the ratio between the pressure in a chamber of inlet air-LPG of the said engine and the said effective pressure of the LPG.

8. Method according to claim 6, characterized by the fact that the said pressure in the said chamber of inlet air- LPG, in at least some of the above working instants, is limited under a determined threshold value at least according to the said effective pressure and of the flow of LPG sent in the above chamber of inlet air-LPG.

9. Group for the feeding of LPG to an internal combustion engine, the group comprising injectors means to feed a variable LPG flow in gaseous phase to the engine, and being characterized by the fact of further comprising first means of determination to determine in a plurality of instants of operation of the engine correspondent temperatures of the LPG sent to the said injectors means, second means of determination to determinate, for at least part of the above temperatures of the LPG, a correspondent value of a maximum optimal pressure of the LPG so that the LPG remains in gaseous phase, and adjusting means to adjust the effective pressure of the LPG going to the means injectors in order that it is substantially equal to the correspondent value of determined maximum optimal pressure value, said second determination includes memory means to memorize a limit curve of the LPG that separates an area of gas in gaseous phase from an area of gas in liquid phase, and calculation means to determine on that curve and at least for some of the said temperatures correspondent pressure values.

10. Group according to claim 9, characterized by the fact that the said adjusting means include, a valve of interception including an inlet suitable to be connected to a tank of LPG, an outlet suitable to be connected to the said injector means, a first chamber communicating with the said outlet and with the said inlet, a second chamber separated from the said first chamber by a flexible diaphragm and a shutter managed by the said diaphragm and movable in a closing position, where it isolates the above first chamber from the said inlet and an opening position, where it allows a passage of gas between the said inlet and the said first chamber, a first correction solenoidvalve placed between the said inlet and the said second chamber, and a second correction solenoidvalve placed between the said second chamber and the said outlet: control means being provided to operate selectively the said first and second solenoidvalve.

11. Group according to claim 10, characterized in that said control includes comparative means to compare in each of the said instant the value of the pressure of the LPG in the said outlet with the said value of maximum optimal pressure and to send a signal of activation towards one or the other of the said solenoidvalves according to the said comparison.

12. Group according to claim 9, characterized by the fact that it moreover includes further determination means to determine, in at least part of the said instants, a value of threshold of the pressure in a chamber of inlet air-LPG at least according to the said pressure effective and of the flow of LPG sent in the said chamber of inlet air-LPG and limiting means to limit the pressure of the said chamber of inlet under said threshold value.

* * * * *